Figure 1:
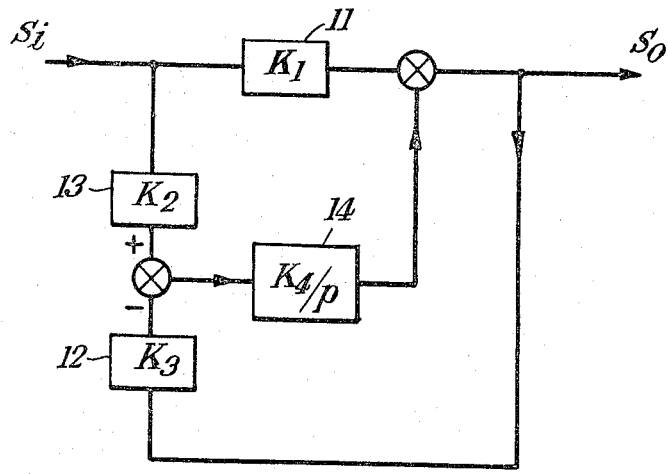

United States Patent Office 3,330,477
Patented July 11, 1967

3,330,477
CONTROL SYSTEMS
Arthur V. Stephens, Belfast, Northern Ireland, assignor to Short Brothers & Harland Limited, Belfast, Northern Ireland, a Northern Ireland company
Filed Aug. 5, 1965, Ser. No. 477,529
Claims priority, application Great Britain, Aug. 13, 1964, 33,062/64
9 Claims. (Cl. 235—61)

The present invention relates to the control of dynamic systems and is particularly though not exclusively concerned with a control system for a V.T.O.L. aircraft.

At the present time most V.T.O.L. aircraft are well equipped with complex electrically-signalled control systems which provide all the artificial damping required to give optimum pilot handling and control, but it has been found that little attention has been paid to controllability and handling in an emergency when a manual control mechanism is required to be operated by the pilot and it is one object of the present invention to provide an alternative manual control system for V.T.O.L. aircraft giving good handling characteristics.

In the design of certain light military V.T.O.L. aircraft, it has been found impracticable to employ an electrically signalled autostabiliser even when only a single channel is provided, as the weight and space penalties imposed upon the aircraft are too great and the maintenance and servicing of the equipment too lengthy and complex. A simple manual control system is therefore required for such aircraft and it is a further object of the present invention to provide for this purpose a manual control system giving good handling characteristics.

It is known that it is difficult to control a V.T.O.L. aircraft manually under hover conditions or at low forward speeds because of the inherent lack of aerodynamic damping and also because the aircraft angular acceleration is directly proportional to control nozzle displacement. It is here suggested that one or more mechanical integrators could be incorporated in the control system in such a manner as to provide improved handling characteristics of the aircraft and the present invention provides a mechanism of this kind resulting in improved accuracy of control and the maintenance of a steadier aircraft position. In addition, the work done by the pilot in terms of control stick displacement can be reduced.

According to the present invention, there is provided a manual control system comprising an input control member which when subjected to an input displacement signal $S_i$ produces an output displacement signal $S_o$ in an output control member, a feedback path including a differential mechanism and an integrator mechanism, said differential mechanism being responsive to a feedback displacement signal representative of $K_3S_o$ obtained from said feedback path, $K_3$ being a constant, and a displacement signal representative of $K_2S_i$ obtained from the input control member, wher $K_2$ is a constant, to produce a difference signal representative of $K_2S_i - K_3S_o$, and said integrator mechanism being responsive to the difference signal to produce an integrated signal representative of $$\frac{K}{p} 4(K_2S_i - K_3S_o)$$

where $K_4$ is a constant and $p$ is a Laplace operator, and combining means for combining the input displacement signal $S_i$ or a signal $K_1S_i$ proportional thereto, where $K_1$ is a constant, with the integrated signal to produce an output displacement signal $S_o$ representative of $$\frac{K(1+pT_1)}{(1+pT_2)} \cdot S_i$$

where $$K = \frac{K_2}{K_3}, \quad T_1 = \frac{K_1}{K_4K_2}, \text{ and } T_2 = \frac{1}{K_4K_3}$$

Figure 2:
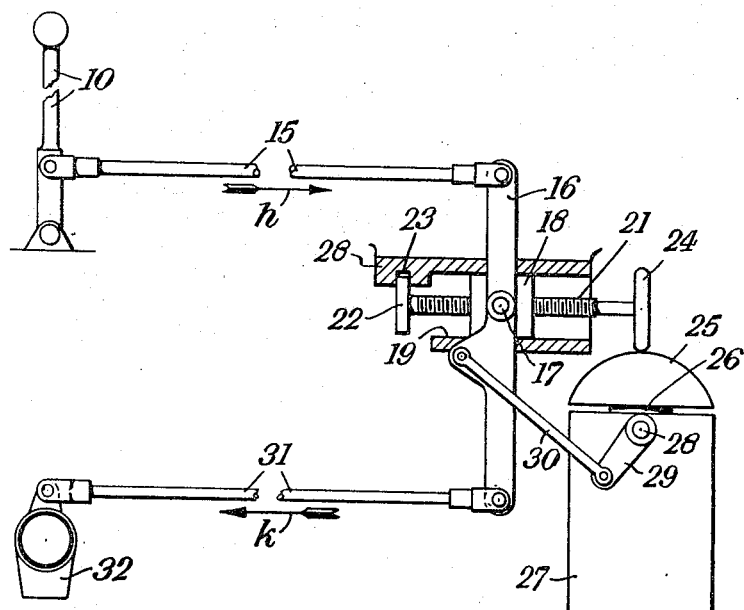

One embodiment of the invention will now be described by way of example with reference to the accompanying drawings in which:

FIG. 1 is a theoretical block diagram of an aircraft control system according to the invention, and FIG. 2 is a schematic diagram of apparatus according to one embodiment of the invention.

Referring first to FIG. 1, an input displacement signal $S_i$ representative of stick displacement is applied to a mechanical linkage to produce an output displacement signal $S_o$ for effecting movement of a control nozzle or other control member of the aircraft. The mechanical linkage is represented by block 11 and mathematically by a proportionality constant $K_1$. The output displacement signal $S_o$ is fed back through a feedback mechanical linkage 12 having a proportionality constant $K_3$ and the input displacement signal $S_i$ is applied via a further linkage 13 having a proportionality constant $K_2$ so as to be combined with the displacement signal $S_o$ for application to an integrator mechanism 14 having a proportionality constant $K_4$. The mechanical output signal from the integrator mechanism 14 is applied to the forward linkage path between the input and the output of the control system and combined with the input displacement signal $S_i$ to produce said output displacement signal $S_o$.

The apparatus illustrated in FIG. 2 is a practical embodiment of the control system shown in FIG. 1. Referring now to FIG. 2, a pilot's control column 10 is coupled to an input shaft 15 in such a way as to produce longitudinal displacement of the shaft 15 in response to movements to the control column. The shaft 15 is pivotally connected to the uppermost end of a differential link 16 mounted for pivotal movement about a horizontal pin 17 carried by a nut 18 constrained to slide without rotation in a bore 19 in a fixed frame 20. The nut 18 carries a screw 21 one end of which is provided with a cylindrical enlargement 22 which is constained to rotate within a groove 23 in the frame 20. The other end of the screw 21 is provided with a wheel 24 arranged to be in contact with the spherical surface of a driving element 25 carried on the end of a shaft 26 of an electrical motor 27 arranged to be driven at a constant speed and mounted for pivotal movement on a shaft 28 arranged to pass through the centre of curvature of the spherical surface of the driving element 25. The motor 27 can be turned about the shaft 28 by a lever 29, the end of which is pivitally connected by a link 30 to an intermediate point on the link 16. The lowermost end of the lever 16 is pivotally connected by a shaft 31 to a control nozzle 32 of the aircraft.

In operation, when the control column 10 is moved by the pilot to cause the input shaft 15 to move in the direction of the arrow $h$, the link 16 turns clockwise about its pivot pin 17, producing a displacement of the shaft 31 in the direction of the arrow $k$. The link 30 is moved longitudinally, causing the lever 29 to turn clockwise through an angle proportional to the angle turned by the link 16 and causing the motor 27 to tilt about the shaft 28 through the same angle. As a result, the wheel 24 is caused to contact a circular path on the spherical surface of the element 25 and to be rotated by an amount which is proportional to the integral of the sine of the angle turned by the lever 16. The nut 18 through which the screw 21 passes is thereby caused to move to the right in the drawing. The movement of the nut 18 in turn causes the link 16 to pivot about its connection with the shaft 15 and the arrangement is such as to bring the motor 27 back to the untilted position shown in the drawing and thus to reduce the displacement of the output shaft 31 to a steady state value proportional to the initial movement of the input shaft 15.

It will be appreciated that the manual control system hereinbefore described may with advantage alternatively be employed for the control of engine thrust in the handling of V.T.O.L. aircraft.

What I claim as my invention and desire to secure by Letters Patent is:

1. A manual control system comprising an input control member and an output controlled member, a differential link connected between said input control member and said output controlled member, said differential link being pivoted about a translatable support, a mechanical integrator having an input member and an output member, said input member being connected to said differential link and said output member being drivably connected to said support for causing translational movement thereof in such a sense as to decrease the displacement of said output controlled member an amount proportional to the integral of the displacement of said integrator input member.

2. A manual control system comprising an input control member and an output controlled member, linkage means connecting said input control member to said output controlled member for causing displacement of said output controlled member in response to a displacement of said input control member, mechanical differential means connected to said linkage and mechanical integrator means connected in feedback relation between said differential means and said linkage means for decreasing the displacement of said output controlled member an amount proportional to the integral of the difference between the displacement of said input control member and the displacement of said output controlled member.

3. A system according to claim 2, wherein said integrator mechanism comprises an input member having a predetermined datum position, said input member being connected to said linkage means, an at least part spherical rotary body adapted to be rotated at a constant speed about a rotary axis passing through the centre of curvature of the body and to be angularly turned in response to the displacement of said input member of the mechanism about a turning axis at right angles to the rotary axis thereof and passing through said centre of curvature of the body, a rotary output member arranged for rotation about an axis at right angles to the turning axis of the body at a point defined by the intersection of said at least part spherical rotary body and said rotary axis when said input member is in said predetermined datum position, said rotary body being drivably connected to said linkage means and in rolling contact with the spherical body, whereby in response to a displacement of the input member of the integrator mechanism from said predetermined datum position the rotary member is caused to contact a circular path on the spherical or part spherical surface of the rotary body and to be rotated by an amount which is proportional to the integral of the displacement of the input member of the integrator mechanism.

4. A system according to claim 3, wherein said input control member is drivingly connected to said output control member through a pivotal lever and wherein said input member of the integrator mechanism is drivably connected to said lever.

5. A system according to claim 4, wherein said pivotal lever is mounted for pivotal movement about a support member drivably coupled to said rotary member of the integrator mechanism in such a way as to be linearly displaceable by an amount proportional to the amount of rotation of said rotary body, the displacement of the support member being in such a sense as to reduce the initial effect of the displacement of the input control member on the displacement of the output control member.

6. A system according to claim 5, wherein the rotary member of the integrator mechanism comprises a screw which is constrained to execute rotational movement only about the longitudinal axis of the screw with a peripheral surface of a cylindrical portion of the screw in rolling contact with the at least part spherical surface of the rotary body, and wherein said support member engages the thread on the screw and is constrained to slide without rotation in the direction of the longitudinal axis of the screw.

7. A system according to claim 6, wherein the input control member is pivotally connected to one end of said pivotal lever, the output control member is pivotally connected to the other end of said lever and wherein said lever is pivotally mounted on said support member at a position intermediate the ends of said lever.

8. A system according to claim 7, wherein the input member to the integrator mechanism comprises a link pivotally connected to the pivotal lever and adapted to cause angular movement of said at least part spherical rotary body about said turning axis.

9. A system according to claim 8, wherein said at least part spherical body of the integrator mechanism is arranged to be driven by a constant speed electric motor.

References Cited
UNITED STATES PATENTS

| | | | |
|---|---|---|---|
| 2,377,898 | 6/1945 | Myers | 74—388 |
| 2,693,709 | 11/1954 | Newell | 74—198 |
| 2,737,820 | 3/1956 | Collar | 74—198 |
| 2,828,638 | 4/1958 | Rullo | 74—388 |
| 2,877,968 | 3/1959 | Granan et al. | 244—388 |
| 2,932,987 | 4/1960 | Foster | 74—388 |
| 3,048,050 | 8/1962 | Perryman | 74—388 |

RICHARD B. WILKINSON, *Primary Examiner.*

L. R. FRANKLIN, *Assistant Examiner.*